United States Patent [19]
Nowak

[11] Patent Number: 5,932,653
[45] Date of Patent: Aug. 3, 1999

[54] LOSS OF DRY INHIBITOR FOR COATING COMPOSITIONS AND ACCELETATOR FOR CURING UNSATURATED POLYESTER RESIN

[75] Inventor: Milton Nowak, South Orange, N.J.

[73] Assignee: Troy Corporation, Florham Park, N.J.

[21] Appl. No.: 08/861,571

[22] Filed: May 22, 1997

[51] Int. Cl.⁶ .............................. C08L 67/06; C08K 5/098
[52] U.S. Cl. ................ 525/17; 525/7.1; 525/19; 525/27; 525/445; 252/367.1; 252/382; 252/384
[58] Field of Search ................... 525/7.1, 17, 19, 525/445; 252/367.1, 382, 384

[56] References Cited

U.S. PATENT DOCUMENTS

| | | |
|---|---|---|
| 3,449,276 | 6/1969 | Rabenold .................................. 525/19 |
| 3,901,837 | 8/1975 | Gottesman et al. . |
| 3,972,825 | 8/1976 | Gottesman et al. . |
| 4,032,354 | 6/1977 | Fraser . |
| 4,175,064 | 11/1979 | Landau et al. . |
| 4,311,625 | 1/1982 | Bellettiere et al. . |
| 4,389,328 | 6/1983 | Bellettiere et al. . |

FOREIGN PATENT DOCUMENTS

| | | |
|---|---|---|
| 2424310 | 11/1979 | France . |
| 1954899 | 1/1997 | Germany . |
| 1236085 | 6/1971 | United Kingdom . |
| 93/08246 | 4/1993 | WIPO . |

*Primary Examiner*—Patricia A. Short
*Attorney, Agent, or Firm*—Banner & Witcoff, Ltd.

[57] ABSTRACT

This invention is directed to a composition comprising a complex reaction product of an oil soluble cobalt soap and an oil soluble overbased calcium soap which serves as a "loss of dry" inhibitor, particularly in an oil-based paint, and as an accelerator with gel-time stabilizer and color development inhibitor characteristics in polyester polymerization.

26 Claims, No Drawings

LOSS OF DRY INHIBITOR FOR COATING COMPOSITIONS AND ACCELETATOR FOR CURING UNSATURATED POLYESTER RESIN

BACKGROUND OF THE INVENTION

1. Field of the Invention

The present imeion is directed to a chemical complex which serves as a "loss of dry" inhibitor, particularly in an oil-based paint, and as a cure accelerator having gel-time stabilizer and color development inhibitor characteristics in polyester resin polymerization. This invention especially relates to the preparation of a complex reaction product of an oil soluble cobalt soap and an oil soluble overbased calcium soap.

2. Description of Related Art

Oil based paints generally reremetal soaps (metal salts of long chain organic acids), particularly a cobalt soap such as cobalt naphtheate, in combination with a lead soap or a zirconium soap, to catalyze the polymerization of drying oils and other oxidizable vehicles used in such coating compositions. While the metal soaps perform quite effectively when they are first compounded in such coating compositions, these compositions often exhibit a reduction in drying rate on aging. For example, when an alkyd paint is highly pigmented, a phenomenon often occrs which has been called "loss of dry"—that is, the alkyd paint does not dry as rapidly after prolonged storage as when first prepared. For example, a paint which may dry in 4 hours when first prepared, may require 6 to 8 hours or longer for drying after 30 days of storage.

It has been suggested that the reduction in the drying rate results from an adsorption of the metal soaps on the surface of pigment particles and extenders used in the coating composition, or possibly by a reacon between the metal soaps and other coating constituents that produce insoluble, and inactive metal compounds. Whatever the reason, the reduction in the drying rate of such coating compositions is generally considered a disadvantage.

Certain "loss of dry" inhibitors have been available in the prior art, which function to counteract the loss of activity observed when using the conventional metal soaps. U.S. Pat. No. 3,901,837, for eaample, describes a solution of a mixture of cobalt, calcium and zinc, or zirconium, oil-soluble metal salts (soaps) of branched-chain aliphatic monocarboxylic acids, having 6–14 carbon atoms, as a loss-of-dry inhibitor. Particularly preferred is a metal salt solution of cobalt 2-ethylhexoate or cobalt isononanoate, calcium naphihenate and zinc 2-ethylhexoate. One loss-of-dry inhibitor comprises a solution of these soaps in an inert non-polar organic solvent. The soaps can be prepared by reacting the oxides or hydroxides of the metals with the appropriate organic acids directly in an organic solvent or by precipitation of the soaps by heating aqueous solution ofthe sodium salts of the acids with water-soluble salts of the metals.

U.S. Pat. No. 4,032,354 describes a loss-of-dry inhibitor constituting a combination of oil-soluble and oil-insoluble calcium salts; in particular a suspension of finely divided calcium hydroxide in a solution of a calcium salt of a 6–14 carbon atom branch-chain aliphatic or 6–10 carbon atom cycloaliphatic monocarboxylic acid or mixture of such acids. Particularly preferred is an organic solvent solution of calcium naphtenate with suspended calcium hydroxide. The loss-of-dry inhibitor composition can be prepared by heating a suspension of a stoichiometric excess of finely-divided calcium hydroxide in an inert solvent with one of the noted organic acids.

"Basic" cobalt naphthenate, which according to the known art consists essentially of cobalt hydroxide dispersed in a carrier such as a petroleum oil and a liquid cobalt naphthenate soap solution also has been used as a loss of dry inhibitor in oil-based coating compositions. "Basic" cobalt naphthenate has been observed to cause wrinkling in paint films when used at efficacious concentrations and causes undesired staining in white and light-colored coatings.

Unfortunately, preparing compositions, such as the "basic" calcium naphthenate of U.S. Pat. No. 4,032,354, "basic" cobalt naphthenate or similar compositions, in a form suitable for use in coating applications has proven to be quite difficult, requiring special milling or grinding equipment to disperse the metal hydroxide adequately. The heat of the milling operation also tends to oxidize the product and discolor it, obviously an undesired consequence in coating applications. Furthermore, it has been difficult to suspend the metal hydroxide satisfaorily in the product, which must remain sufficiently fluid so that it can be poured from a drum.

Compositions prepared by milling calcium or cobalt hydroxide are not completely soluble in vehicles such as petroleum solvent, drying oils or resin solutions. Usually, when added to such vehicles and allowed to stand before use, a certain amount ofthe metal oxide or hydroxide (calcium hydroxide, and cobalt hydroxide (or cobalt oxide)) will be found to have settled out. Besides contributing to a lengthening of the drying time, the presence of this insoluble loss of dry inhibitor component may also cause hazing of clear films of paint or the hazing of a polyester resin.

As a result, there remains a need in the art for a loss of dry inhibitor which better maintains drying activity during storage, is easier to use in coating compositions, and avoids subsidiary problems such as settling out or hazing.

Unsaturated polyester resin compositions also employ metal soaps, akin to those discussed above, as cure accelerator systems. Such resins typically comprise solutions of an unsaturated polyester resin in a polymerizable monomer which cros-links the polyester polymer chains. The polyester resin and monomer copolymerize upon the introduction of a peroxide initiator to form a rigid, insoluble, infusible material. These unsaturated polyester resin compositions have found widespread use in the production of coatings, laminates, cast articles, molded articles, and other shaped articles.

The cure accelerator is usually added to an unsaturated polyester resin composition to accelerate the decomposition of the peroxide catalyst to free radicals and thereby intite or speed the curing of the composition (gel formation and ultimate hardening) at relatively low temperatures, i.e., at temperatures generally in the range of 0° to 30° C. Cobalt soaps of organic acids remain one of the most widely-used cure accelerators for the low temperature decomposition of peroxide catalysts and the curing of unsaturated polyester resin compositions.

It also is known that the curing time of unsaturated polyester resin compositions at low temperatures can be further reduced by the use of a second accelerator in combination with the normally used cobalt compounds. Such co-accelerators include amines, such as dimethylaniline, diethylethanolamine and tetramethylbutane diamine and aliphatic polyamines, such as diethylene triamine and 3,4-diamino-3,4-dimethylhexane.

U.S. Pat. No. 4,175,064 describes another accelerator system for peroxide-initiated unsarated polyester resin compositions. The accelerator system comprises a mixture of neutral cobalt and potassium salts (soaps) of organic monocarboxyic acids having from 6 to 24 carbon atoms.

BRIEF DESCRIPTION OF THE INVENTION

The loss of dry inhitor product (or polyester cure accelerator system) of this invention is a non-polar, organic solvent soluble (i.e., oil soluble) chemical complex prepared by reacting an oil soluble cobalt soap with an oil soluble over-based calcium soap in a non-aqueous, preferably non-polar organic solvent system. The complex is completely soluble in non-polar solvents, drying oils, alkyd resins, and the like, used in the formulation of paints and other coating compositions, as well as in polyester resin compositions. As a result, the chemical complex of the invention is better able to maintain its effectiveness on prolonged storage of the coating composition than inhibitors which contain an insoluble particle as one of the key constituents.

The organic solvent soluble chemical complex that constitutes the loss of dry inhibitor (and polyester resin cure accelerator) of the present invention is produced by reacting an oil soluble cobalt soap with an oil soluble overbased calcium soap in a non-aqueous, organic solvent system.

DETAILED DESCRIPTION OF THE INVENTION

Suitable organic solvents, especially non-polar solvents, suitable as the medium for peg the loss of dry inhibitor (or cure accelerator) of the present invention nay consist of an aliphatic or cycloaliphitic solvent such as hexane, heptane, octane, isooctane, cyclohexane, and cycloheptane; petroleum distillates such as mineral spirits, gasoline, diesel fuel, and fuel oils; aromatic hydrocarbones such as benzene, toluene, xylene, and ethylbezene; and chlorinated compounds such as chlorobenzenes, caron tetrachloride, and ethylene dichloride, a glycol such as tripropylene glycol, dipropylene glycol mono methyl ether, or combinations of these non-polar organic solvents.

The cobalt soaps used in maling the chemical complex include the known cobalt soaps derived from organic monocarboxylic acids that have from 6 to 24 carbon atoms. A used herein the term "soap" refers to a metal salt of a monocarboxylic acid, especially those acids commonly referred to as fatty acids. Useful acids include saturated and unsaturated aliphatic, aromatic and alicyclic monocarboxylic acids, for example, hexanoic acid, n-octanoic acid, 2-ethylhexanoic (octoic) acid, nonanoic acid, isononanoic acid, decanoic acid, isodecanoic acid, neodecanoic acid, lauric acid, myristic acid, stearic acid, arachidic acid, behenic acid, oleic acid, linoleic acid, erucic acid, p-tert-butylbenzoic acid, monobutyl maleate, monodecyl phthalate, naphthenic acid, cyclopentanoic acid, cyclohexanoic acid, cycloheptanoic acid, and methylcyclohexanoic acid. It is generally preferred to use a cobalt soap of aliphatic monocarboxylic acids having 8 to 12 carbon atoms or aromatic or alicyclic monocrboxylic acids having 6 to 24 carbon atoms in the preparation of the complex. Particularly advantageous results are expected using a complex derived from cobalt octoate (2-ethylhexanoate), cobalt iso-octanoate, cobalt naphthenate, cobalt oleate, cobalt neo-decanoic acid or combinations thereof. The soaps can conveniently be utilized in the form of a solution in a non-polar organic solvent.

Overbased calcium soaps used to make the chemical complex of the invention include compounds that contain a significantly higher percentage of calcium than the formula $Ca(OOC-R)_2$ would indicate. These materials are generally obtained by reacting an organic carboxylic acid, such as those identified above in connection with the description of the cobalt soap, with an excess of $Ca(OH)_2$ in the presence of $CO_2$ and a catalyst and with effective removal of by-product water. Conditions for conducting this reaction are known in the art. Suitable organic carboxylic acids include 2-ethylhexanoic acid, iso-octanoic acid, nonanoic acid and iso-nonanoic acid.

Products obtained from this ternary reaction system are generally considered in the literature to have the formula: $(RCOO)_2$ $Ca.n(CaCO_3)$ where n=number of moles. These materials are oil (non-polar solvent) soluble and are referred to throughout this application as overbased calcium soaps.

The amount of calcium contained in the overbased calcium soap that exceeds the percent calcium in the neutral soap, $Ca(OOCR)_2$, is measured by an analysis for the calcium content and the acid content of a given quantity of material, as reported in the literature. The extent of the excess of calcium is referred to as the materials basicity and is expressed by the formula:

$$\frac{2\times(\text{Moles of Ca in 100 g of Sample})}{\text{Moles of Acid in 100 g of Sample}} = \text{Basicity}$$

An neutral calcium soap having the proper stoichiometry has a basicity of 1.0. An oveiased calcium soap will have abasicity of greater than 1.0. For example, )100 g of an oveased calcium soap is analyzed and found to contain 10% calcium as metal, [or 0.249 M] and 50% acid as 2-ethylhexanoic acid, [or 0.34 M.].

The basicity of this soap is measured and determined as:

$$\frac{2\times(0.249M \text{ (Calcium)})}{0.34M \text{ 2-Ethylhexanoic Acid}} = 1.46 \text{ (Basicity)}$$

Overbased calcium soaps that are usefull for preparing the chemical complex products of this invention may vary in basicity from 1.1 to 2.8, although values of 1.4 to 2.5 generally are preferred.

Preferred overbased calcium soaps can be prepared from mono carboxylic acids such as 2-ethylhexanoic acid, iso-octanoic acid, neodecanoic acid, naphthenic acid, and oleic acid. Using the same monocarboxylic acid to prepare both the cobalt soap and the overbased calcium soap generally is favored. Overbased calcium soaps are available commercially. One product suitable for use in preparing the composition of the present invention is Troymax® Calcium 10%, having a basicity of 1.53 available from Troy Corporation.

To prepare the chemical complex-containing compositions which constitute the lose of dry inhibitor (and polyester resin cure accelerator system) of this invention, a cobalt soap or a solution of a cobalt soap in a suitable non-polar organic solvent is mixed with a quantity of a non-polar organic solution of an overbased calcium soap. Upon mixing there is an immediate increase in the viscosity of the composition and a slight evolution of carbon dioxide may be observed. The resulting complex product is a bright blue violet solution. The overbased calcium soap and the cobalt soap are mixed in a proportion, and at concentration, to provide from about 0.2 mole to 2.0 moles of calcium per mole of cobalt in the composition and from about 2% to 15% by weight of total metal, preferably about 2% to 11% total metal in the solution.

A key feature of the present invention is that the complex, loss of dry inhibitor of this invention is soluble in inert, non-polar, organic solvents. As a result, the problems that are commonly encountered upon the use of prior art loss of dry inhibitors which contain suspended solids are completely avoided. The inventive loss of dry inhibitors, thus, can be used in both coating (e.g., alkyd paint) applications and in fromulating polyester resin compositions while avoiding problems of solids settling out and hazing.

The loss of dry inhibitor composition of the invention can be included in a coating formulation (composition) in an amount of 0.1% to 5% by weight. The ultimate metal content in the coating composition from the loss of dry inhibtor is normally between 0.002% and 1% by weight. Such coating formulations include paints, varnishes, enamels, printing ink and similar compositions which contain oxidizable organic film-forming resinous components. Such components may include a drying oil such as linseed oil, soybean oil, tung oil and dehydrated castor oil; and alkyd resin comprising the product of reacting a polyhydric alcohol such as pentaerythritol or glycerol with a discarboylic acid such as prthalic anhydride or isophthalic acid and a monocarbodylic acid such as soybean oil fatty acids or linseed oil fatty acids or oleoresinous varnish, which is the reaction product of drying oil with resin, a modified resin or a phenolic resin.

The coating composition also generally contains a conventional metal soap drier, particularly a cobalt lead or zinc salt of naphthenic acid, octanoic acid, nonanoic acid or tail oil acid.

In addition to the drying oil and other resinous components, the solvent, and the drier system (including the loss of dry inhibitor of the present invention), the coating compositions of this invention may contain pigments, dyes, extenders, plasticizer, antiskinning agents, surfactants, stabilizers, defoamers, fungicides, leveling agents, and other additives commonly used in surface-coating compositions in the amounts ordinarily used for the purposes indicated.

Another aspect of the present invention concerns the discovery that unsatuated polyester resin compositions can be cured rapidly and thoroughly at low temperatures by means of a peroxide catalyst and an accelerator system that comprises the complex formed by reacting an oil soluble cobalt soap with an oil soluble over-based calcium soap in a non-aqueous, organic solvent system. The accelerator composition of the present invention provides less gel time drift on aging (gel time stabilization) than are obtained when the same amount or a larger amount of a conventional cobalt soap is used. It also inhibits development of the deep rose color that is characteristic of the use of cobalt accelerators.

Unsaturated polyester resins that are used in the practice of this aspect of the present invention are unsaturated polyester resins formed by condensing a saturated dicarboxylic acid or anhydride and an unsaturated dicarboxylic acid or anhydride with a dihydric alcohol. Such unsaturated polyester resins are well known to those skilled in the art. In the curing of such resins, a three-dimensional structure is produced by reacting the unsaturated polyester through the unsaturated acid component with an unsaturated monomer that is capable of reacting with the polyester resin to form cross-linkages. One of the most commonly used unsaturated monomers is styrene.

As the organic peroxide, one generally uses one that decomposes to release free radicals at temperatures in the range of 0° to 30° C. to catalyze the copolymerization reaction between the unsaturated polyester resin and the unsaturated monomer. Such peroxides are well known to those skilled in this technology.

The accelerator composition can be included in an unsaturated polyester resin composition in an amount of 0.1% to 5% by weight. The ultimate metal content in the polyester resin composition from the complex accelerator of the present invention is normally between 0.002% and 1% by weight.

Unsatted polyester resin compositions with which the complex accelerator of the present invention is siutably employed may also contain an inhibitor, such as tert-butyl-catechol or hydroquinone, fillers and pigments, dyes, mold release agents, plasticizers stabilizer; flame-retardants, and other additives in the amounts ordinarily used for these purposes.

The unsaturated polyester resin compositions that comprise an unsaturated polyester resin, an unsaturated monomer, a peroxide catalyst, and an accelerator system that contains the complex of a cobalt soap and an overbased calcium soap, cure rapidly without application of heat to form rigid, insoluble, and infusible products.

The following examples are presented to illustrate and explain the invention. In theese examples, all parts are parts by weight and all percentages are percentages by weight.

EXAMPLE 1

100 g of a mineral spirits solution of cobalt 2-ethylhexanoate containi 12% cobalt (0.20 mole) as metal were mixed with 100 g of a mineral spirits solution of an overbased calcium isooctanoate containing 10% calcium as metal (0.25 mole). The basicity of the calcium soap was 1.46. The product was a bright blue violet viscous liquid.

EXAMPLE 2

100 g of a mineral spirits solution of cobalt naphthenate containing 8% cobalt as metal (0.135 mole) were added to 100 g of an overbased calcium isooctanoate containing 10% calcium as metal (0.25 mole). The basicity of the calcium soap was 1.7. The product was a bright blue violet viscous liquid, containing 4% cobalt as metal and 5% calcium as metal.

EXAMPLE 3

100 g of a 6% cobalt solution of cobalt 9-octadecenoate acid [oleic acid] in toluene were added to 50gm of a 10% calcium solution of overbased calcium isooctanoate in mineral spirits containing 5 gm calcium as metal (0.125 mole). The basicity ofthe calcium solution was 1.55. The product was a clear blue violet )vicous solution containing 4% cobalt as metal and 3.3% calcium as metal.

EXAMPLE 4

100 g of a 12% cobalt solution of cobalt isooctanoate in mineral spirits containing 12 gm cobalt as metal were added to 150 gm of a 10% calcium solution of an overbased calcium 2-ethylhexanoate containing 15 gm calcium as metal. The basicity of the calcium soap was 1.1. The product formed was a clear blue violet viscous liquid containing 4.8% cobalt as metal and 6% calcium as metal.

EXAMPLE 5

The effectiveness of the products of this invention in preventing loss of dry in paints was tested in a paint formulation which was previously noted for experiencing a loss of dry on aging.

The paint consisted of a toluidine red alkyd enamel prepared as follows:

Mix in a stainless steel ball mill:

| | |
|---|---|
| Mineral Spirits | 100 gm. |
| T & W #300 Super Alkyd | 100 gm. |
| Toluidine Red | 100 gm. |

Allow To Mix In Ball Mill For 16 Hours
Add the Following Ingredients While Continuing Mixing:

| | |
|---|---|
| T & W #300 Super Alkyd | 429 gm. |
| Troymax ® Cobalt 6% | 2.2 gm. |
| Troymax ® Calcium 6% | 4.4 gm. |
| Troykyd Anti-Skin B | 1.1 gm. |

T&W#300 Super Alkyd is a pure long oil, oxidizing type, soya, pentaerythiritol pathalate resin solution, supplied as 60% solids in mineral spirits available from Thibaut & Walker, Newark, N.J.

TROYMAX® Cobalt 6% is a mineral spirits solution of cobalt 2-ethylhexanoate containing 6% cobalt as metal.

TROYMAX® Calcium 6% is a mineral spirits solution of calcium 2-ethylhexanoate containing 6% calcium as metal. It is neutral or slightly acid.

Troykyd® Anti Skin B is a Methyethylketoxime.

Drying tests with the products of this invention were carried out using accelerated conditions as shown in Table 1. The various test compositions were aged overnight and applied to glass panels with a 3 mil bird applicator. Tack free drying time and Sward hardness were determined. The various test paint compositions then were aged in an oven at 125° F. for 3 weeks, and the drying tests repeated.

TABLE I

| | | | Initial Results | | 3 Weeks At 125° F. | |
|---|---|---|---|---|---|---|
| Test No. | Loss of Dry Additive | Level Gms/ 100 gms. | Tack-Free Time: Hours | Sward Hardness | Tack-Free Time: Hours | Sward Hardness |
| 1 | None | 0 | 5 | 4 | 7+ | 10 |
| 2 | Example 1 | 0.26 | 4.0 | 4 | 5.1 | 12 |
| 3 | Example 2 | 0.26 | 4.0 | 4 | 5.5 | 11 |
| 4 | Example 3 | 0.26 | 4.7 | 4 | 5.5 | 10 |
| 5 | Example 4 | 0.26 | 4.3 | 4 | 5.0 | 12 |

EXAMPLE 6

The complex chemical products of this invention were tested in unsaturated polyester resins as a cure accelerator providing gel-time stabilization and as a means of reducing or elimnating the pink discoloration that often results from the use of cobalt compounds as accelerators/gel stabilizers.

Thus, the following resin solutions were prepared:

| Solution A | |
|---|---|
| Polyester Resin: Reichhold Plyolite 31-275-55 | 1000 gm |
| Troymax ® Cobalt 12% | 10 gm |

The solution was stirred until uniform and allowed to stand for 24 hours.

| Solution B | |
|---|---|
| Polyester Resin: Reichhold Plyozite 31-275-55 | 1000 gm |
| Product of Example 1 | 10 gm |

| Solution C | |
|---|---|
| Polyester Resin: Reichhold Pliolite 31-275-55 | 1000 gm |
| Product of Example 2 | 10 gm |

The solution was stirred until uniform and allowed to stand for 24 hours.

| Solution D | |
|---|---|
| Polyester Resin: Reichhold Pliolite 31-275-55 | 1000 gm |
| Product of Example 3 | 10 gm |

The solution was stirred until uniform and allowed to stand for 24 hours.

| Solution E | |
|---|---|
| Polyester Resin: Reichhold Pliolite 31-275-55 | 1000 gm |
| Product of Example 4 | 10 gm |

The solution was stirred until uniform and allowed to stand for 24 hours.

After the standing period, three 100 gm portions of each formulation were placed in 4-ounce glass jars.

To one jar of each formulation was added 1 gm methylethylketone peroxide as a resin hardener (30 wt. % in dimethyphthalate). Each formulation was then tested for gel-time and time to harden.

The renaining jars were stored in an oven at 50° C. for accelerated testing, and ajar of each formulation was tested after addition of methylethylketone peroxide, for gel-time and hardening time, at intervals of 2 weeks and 4 weeks respectively. The results ofthese tests are given in Table II.

TABLE II

| | | | Initial Tests | | 2-Week Test | | 4-Weeks Test | |
|---|---|---|---|---|---|---|---|---|
| Test No. | Color* | Additive | Gel Time | Hardening Time | Gel Time | Hardening Time | Gel Time | Hardening Time |
| 1 | 10 | Troymax Co 12% | 7 1/2 min | 12 1/2 min | 8 min | 22 min | 10 min | 33 min |
| 2 | 1 | Example 1 | 7 1/2 min | 12 1/2 min | 6 min | 23 min | 7 min | 24 min |
| 3 | 2 | Example 2 | 8 min | 13 min | 7 min | 24 min | 8 min | 25 min |

TABLE II-continued

|  |  |  | Initial Tests | | 2-Week Test | | 4-Weeks Test | |
| --- | --- | --- | --- | --- | --- | --- | --- | --- |
| Test No. | Color* | Additive | Gel Time | Hardening Time | Gel Time | Hardening Time | Gel Time | Hardening Time |
| 4 | 2 | Example 3 | 8 min | 13 1/2 min | 8 min | 25 min | 9 min | 26 min |
| 5 | 1 | Example 4 | 7 1/2 min | 12 min | 5 min | 22 min | 5 min | 23 min |

*Color is reported on an arbitrary scale as follows:
10 is distinct rose color (Determined After Hardening)
1 is substantially water white
2 is faint trace of pink It was found, in the course of testing, that a given weight percent of the inventive complex product was equivalent in effectiveness in fixing gel-time and in fixing hardening time, to an equal weight percent of a cobalt soap containing a higher percentage of cobalt. Furthermore, the inventive complex was able to accomplish such results while avoiding the discoloration effect encountered when using conventional cobalt driers.

While certain specific embodiments of the invention have been described with particularity herein, it will be recognized that various modifications thereof will occur to those skilled in the art and it is to be understood that such modificatons and variations are to be included within the preview of this application and the spirit and scope of the appended claims.

I claim:

1. A loss of dry inhibitor for a coating composition containing oxidizable organic film-forming resinous components or a cure accelerator for unsaturated polyester resin compositions which comprises a composition containing an organic solvent solution of a complex formed by mixing an oil soluble cobalt soap of a monocarboxylic acid having 6 to 24 carbon atoms with an oil soluble, overbased calcium soap of a monocarboxylic acid having 6 to 24 carbon atoms, wherein the overbased calcium soap has a basicity of from 1.1 to 2.8.

2. The composition of claim 1 having a total metal content of from 2% to 15% by weight, wherein the oil soluble cobalt soap and the oil soluble, overbased calcium soap are mixed in amounts which provide 0.2 mole to 2.0 moles of calcium per mole of cobalt.

3. A composition as defined in claim 2 that has a total metal content of from 2% to 11% by weight.

4. A coating composition containing the loss of dry inhibitor composition of claim 3.

5. A coating composition containing the loss of dry inhibitor composition of claim 2.

6. The coating composition of claim 5 having a metal content from said loss of dry inhibitor between 0.002% and 1% by weight.

7. A composition as defined in claim 1 that is a non-polar organic solvent solution of a complex formed by mbdng a cobalt salt of a monocarboxylic acid having 8 to 12 carbon atoms with an overbased calcium salt of a monocarboxylic acid having 8 to 12 carbon atoms.

8. A coating composition containg the loss of dry inhibitor composition of claim 7.

9. A coating composition containing the loss of dry inhibitor composition of claim 1.

10. The coating composition of claim 9 having a metal content from said loss of dry inhibitor between 0.002% and 1% by weight.

11. The composition of claim 1 wherein the cobalt soap and the overbased calcium soap are derived from a monocarboxylic acid independently selected from 2-ethylhexanoic acid, naphthenic acid, isooctanoic acid, neodecanoic acid and combinations thereof.

12. The composition of claim 11 wherein the over-based calcium soap is obtained from isooctanoic acid.

13. The composition of claim 11 wherein the over-based calcium soap is obtained from 2-ethylhexanoic acid.

14. The composition of claim 11 wherein the over-based calcium soap is obtained from naphthenic acid.

15. The composition of claim 1 wherein the cobalt soap is obtained from a monocarboxylic acid selected from 2-ethylhexanoic acid, isooctanoic acid, naphthenic acid and oleic acid.

16. An improved process for curing an unsaturated polyester resin composition which comprises contacting a composition comprising an unsaturated polyester resin and an unsaturated monomer capable of reacting with said unsaturated polyester resin in the presence of an organic peroxide with an accelerator system, said accelerator system containing an organic solvent soluble complex formed by mixing an oil soluble cobalt soap of a monocarboxylic acid having 6 to 24 carbon atomns with an oil soluble overbased calcium soap of a monocarboxylic acid having 6 to 24 carbon atoms wherein the overbased calcium salt has a basicity of from 1.1 to 2.8.

17. The process of claim 16 wherein the oil soluble cobalt soap and the oil soluble overbased calcium soap are mixed in amounts which provide 0.2 mole to 2.0 moles of calcium per pole of cobalt.

18. The process of claim 17 wherein the accelerator system is present in an amount that will provide from 0.002% to 1.0% by weight of metal based on the weight of the unsaturated polyester resin composition.

19. The process of claim 17 wherein the accelerator system comprises a complex formed by mixing an oil soluble cobalt soap and an overbased calcium soap each derived from a monocarboxylic acid selected from the group consisting of aliphatic acids having 8 to 12 carbon atoms and alicyclic and aromatic acids having 6 to 24 carbon atoms.

20. The process of claim 17 wherein the complex of the oil soluble cobalt soap and the overbased calcium soap is added to the unsaturated polyester resin composition as a solution in a non-polar organic solvent, said solution having a total metal content of from 2% to 15% by weight.

21. An unsaturated polyester resin composition which comprises:
   (a) an unsaturated polyester resin;
   (b) an unsaturated monomer capable of reacting with the unsaturated polyester resin;
   (c) an organic peroxide initiator; and
   (d) an accelerator system which comprises an organic solvent soluble complex formed by mixing an oil soluble cobalt soap and an oil soluble overbased calcium soap, wherein said soaps are based on aliphatic, aromatic and alicyclic monocarboxylic acids having 6 to 24 carbon atoms, wherein the overbased calcium soap has a basicity of from 1.1 to 2.8;

said accelerator system being present in said composition in an amount that will provide from 0.002% to 1.0% by weight cobalt and calcium metal based on the total weight of the unsaturated polyester resin and the unsaturated monomer.

22. The unsaturated polyester resin composition of claim 21 wherein the oil soluble cobalt soap and the oil soluble overbased calcium soap are mixed in amounts which provide 0.2 mole to 2.0 moles of calcium per mole of cobalt.

23. The unsaturated polyester resin composition of claim 22 wherein the accelerator system comprises a complex formed by mixing an oil soluble cobalt soap and an oil soluble overbased calcium soap, wherein said soaps are based on monocarboxylic acids selected from the group consisting of aliphatic acids having 8 to 12 carbon atoms and alicyclic and aromatic acids having 6 to 24 carbon atoms.

24. A composition suitable as a loss of dry inhibitor for a coating composition containing oxidizable organic film-forming resinous components or suitable as a cure accelerator for unsaturated polyester resin compositions prepared by mixing an oil soluble cobalt soap of a monocarboxylic acid having 6 to 24 carbon atoms with an oil soluble, overbased calcium soap of a monocarboxylic acid having 6 to 24 carbons atoms in an organic solvent, wherein the overbased calcium soap has a basicity of from 1.1 to 2.8.

25. The composition of claim 24 having a total metal content of from 2% to 15% by weight, wherein the oil soluble cobalt soap and the oil soluble, overbased calcium soap are mixed in amounts which provide 0.2 mole to 2.0 moles of calcium per mole of cobalt.

26. A composition as defined in claim 25 that has a total metal content of from 2% to 11% by weight.

* * * * *